United States Patent [19]

McQuoid et al.

[11] Patent Number: 4,671,603

[45] Date of Patent: * Jun. 9, 1987

[54] OPTICAL FILTERS AND MULTIPLEXING-DEMULTIPLEXING DEVICES USING THE SAME

[75] Inventors: James A. McQuoid, St. Asaph; Stuart S. Duncan, North Wales, Wales

[73] Assignee: Pilkington P.E. Limited, United Kingdom

[*] Notice: The portion of the term of this patent subsequent to Jun. 2, 2004 has been disclaimed.

[21] Appl. No.: 668,820

[22] Filed: Nov. 6, 1984

[30] Foreign Application Priority Data

Nov. 17, 1983 [GB] United Kingdom ............... 8330650

[51] Int. Cl.[4] .......................... G02B 5/32; G02B 6/26; G02B 6/34
[52] U.S. Cl. .................................... 350/3.7; 350/96.15; 350/96.19
[58] Field of Search .................... 350/96.19, 3.7, 166, 350/96.15

[56] References Cited

U.S. PATENT DOCUMENTS

| | | | |
|---|---|---|---|
| 3,675,990 | 7/1972 | Kogelnik et al. | 350/311 |
| 3,814,498 | 6/1974 | Tomlinson, III, et al. | 350/96 WG |
| 4,017,158 | 4/1977 | Booth | 350/162 SF |
| 4,111,524 | 9/1978 | Tomlinson, III | 350/96.19 |
| 4,208,637 | 6/1980 | Matsuda et al. | 331/94.5 C |
| 4,274,706 | 6/1981 | Tangonan | 350/96.19 |
| 4,359,259 | 11/1982 | Horner et al. | 350/3.7 |
| 4,387,955 | 6/1983 | Ludmon et al. | 350/3.7 |

FOREIGN PATENT DOCUMENTS

| | | |
|---|---|---|
| 037787 | 10/1981 | European Pat. Off. |
| 067972 | 12/1982 | European Pat. Off. |
| 074143 | 3/1983 | European Pat. Off. |
| 1061319 | 3/1967 | United Kingdom |
| 1333391 | 10/1973 | United Kingdom |
| 2014752B | 8/1979 | United Kingdom |
| 2054995A | 2/1981 | United Kingdom |
| 2071866A | 9/1981 | United Kingdom |
| 2105489A | 3/1983 | United Kingdom |
| 2118360A | 10/1983 | United Kingdom |

*Primary Examiner*—John K. Corbin
*Assistant Examiner*—D. Edmondson
*Attorney, Agent, or Firm*—F. Eugene Davis, IV; Mark P. Stone

[57] ABSTRACT

Lack of versatility and efficiency in optical multiplexing/demultiplexing is countered by progressing incident light along a wavelength selective holographic reflection filter which reflects different wavelengths at different positions along the filter. Light from a fibre optic input cable is directed by mirrors to make successive passes at the filter at respective different positions therealong and detectors receive the respectively reflected wavelengths. The filter preferably varies the reflected wavelength continuously and progressively as the incident light progresses along the filter.

13 Claims, 8 Drawing Figures

OPTICAL FILTERS AND MULTIPLEXING-DEMULTIPLEXING DEVICES USING THE SAME

BACKGROUND OF THE INVENTION

This invention concerns improvements in or relating to optical filters and more particularly to wavelength selective reflective filters which can be used, in particular, in multiplexing or demultiplexing systems. The invention relates to apparatus, and more particularly demultiplexing and multiplexing apparatus, employing such filters.

It has previously been proposed to provide in a multiplexer/demultiplexer a reflective grating arranged so that, in demultiplexing mode, a beam of incident light having a plurality of wavelengths impinges on the grating to be reflected therefrom as a plurality of angularly separated beams of different respective wavelengths which are received at respective spatially separated detector positions. In multiplexing mode a plurality of beams of different respective wavelengths are incident on the grating from spatially separated positions and are reflected from the grating as a combined beam to a single output position. Such systems, examples of which are disclosed in U.S. Pat. Nos. 4,111,524, 4,274,706, 4,387,955, European Patent Applications Publication Nos, 0,037,787, 0,067,972, and 0,074,143 and U.K. Patent Application G.B. No. 2,105,489A, can tend to lack versatility and be rather inefficient.

Optical gratings have also been proposed for wavelength selective uses in other devices such as integrated optical circuit devices, see for example U.S. Pat. No. 3,814,498, and other forms of colour selective devices, including holographic devices, have been suggested for various purposes—see for example U.S. Pat. Nos. 3,675,990 and 4,208,637 and U.K. Patent Application G.B. Nos. 2,054,995A and 2,071,866A.

SUMMARY OF THE INVENTION

According to the present invention there is provided apparatus comprising a wavelength selective holographic reflection filter capable of reflecting different wavelengths, light input means for introducing light to the filter, means for causing the light to travel relatively to the filter in a manner which progresses the position and/or angle at which the light is incident on the filter so that the filter reflects different wavelengths at the respective different positions and/or angles of incidence, and light receiving means for receiving light from the filter. Preferably the light input means introduces substantially collimated light.

The filter, with a given angle of incidence, may reflect different wavelengths at different positions along the filter, and the means for causing the light to travel relatively to the filter in the said manner may comprise means for causing the light to strike the filter at different positions along the filter. These may comprise means for effecting relative movement between the filter and the light input means so as to change the position of incidence of light on the filter, or the means for causing the light to travel relatively to the filter in the said manner may comprise light directing means for directing the light to make a plurality of successive passes at the filter, which may be at respective different positions therealong.

The apparatus may be demultiplexing or multiplexing apparatus.

In demultiplexing apparatus the light input means, such as a fibre optic cable, can be arranged to introduce to the filter a substantially collimated light beam having a plurality of wavelengths at an angle such that it progresses along the filter, and each pass at the hologram separates out the wavelength reflected by the hologram at that position and the reflected light is received by a receiving means, such as a detector, or an optical element such as an optical fibre which passes it to a detector. Light transmitted through the hologram at a pass is directed by the light directing means, which may comprise mirrors, to make the next pass. The successive passes at the filter may be from opposite sides thereof alternately and said light directing means may comprise opposed mirrors located respectively on said opposite sides of the filter. Alternatively, the successive passes at the filter may all be from the same side thereof and the light directing means may be arranged to direct light transmitted through the hologram at one pass round to make the next pass from the same side. The light directing means may comprise a plurality of mirrors, conveniently three, which may be provided by faces of a bar of transparent material, for example by alternate faces of a bar of hexagonal cross section. The filter may comprise a transparent substrate having a hologram coating along part, e.g. about one half, only of the width of the substrate, so that light transmitted through the hologram at one pass is returned by transmission through the part of the substrate not having the hologram coating to make the next pass at the hologram from the same side.

In multiplexing apparatus a plurality of light input means, such as optical fibres, can be arranged to introduce respective substantially collimated light beams of different wavelengths to the filter at positions along the hologram where light of the respective wavelength is reflected thereby, and at an angle such that the beams progress along the filter, and each pass at the hologram effectively collects the relevant wavelengths into a combined beam which is received by an output receiving means, such as a fibre optic cable. Introduced light of a wavelength reflected by the hologram at one pass position is directed by the light directing means to the next pass position where it is transmitted through the hologram and combines with introduced light of a wavelength reflected by the hologram at that next pass position. Thus multiplexing apparatus can be basically similar to demultiplexing apparatus but operating in reverse mode.

The holographic reflection filter can preferably continuously and progressively vary the reflected wavelength with a given angle of incidence as the incident light progresses along the filter.

The invention further provides, according to this aspect, a wavelength selective holographic reflection filter suitable for use in the apparatus comprising a substrate having a hologram coating with refractive index variations through its thickness corresponding to interference fringes running generally parallel to the surface of the substrate carrying the coating but slightly relatively inclined so that the fringe spacing continuously and progressively increases along the filter. The hologram coating may have a continuously varying refractive index through its thickness (for example the variation may be of sinusoidal form) such that there are planes or strata of uniform refractive index effectively providing apparent layers of relatively high and low index, these apparent layers lying generally parallel to the substrate surface carrying the coating but slightly relatively inclined so that the spacing between the apparent layers continuously and progressively increases along the hologram. Such increase in spacing between the fringes or apparent layers provides a corresponding increase in the wavelength of light reflected by the hologram for a given angle of incidence as the position of incidence travels along the filter.

The hologram may be constructed in the coating by backing it with a mirror and illuminating with a divergent monochromatic recording beam, or by the scanning of a collimated monochromatic recording beam, so as to produce a range of incidence angles, each angle corresponding to a particular position along the length of the hologram. Interference between the incident beam and the beam reflected from the backing mirror produces fringes whose spacing continuously and progressively increases along the coating.

The coating material is preferably dichromated gelatine and the substrate is preferably of glass. The final filter may comprise a laminate in which the coating containing the hologram is sandwiched between a transparent substrate and a transparent cover, which may also be of glass. The substrate surface carrying the coating may conveniently be planar and the substrate, and the cover if provided, may conveniently be of basically planar platelike form. The faces of the substrate, and cover if provided, not covered by the hologram coating may have anti-reflection coatings.

BRIEF DESCRIPTION OF THE DRAWINGS

In order that the invention may be better understood, reference will now be made to the accompanying drawings illustrating certain embodiments thereof by way of example, and in which.

DETAILED DESCRIPTION

Figure 1:
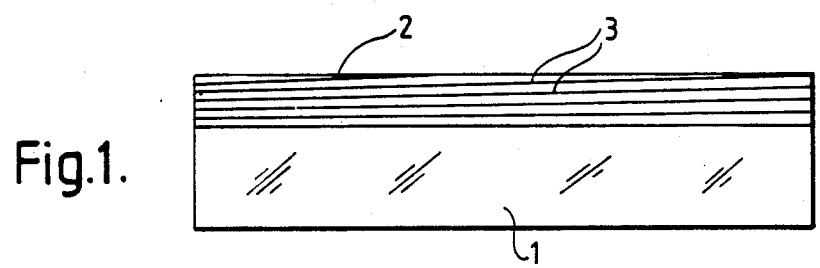
FIG. 1 is a schematic representation of a holographic optical reflection filter, FIG. 2 schematically shows an arrangement which may be used in recording the hologram in the filter of FIG. 1, FIGS. 3 and 4 schematically show embodiments of optical filtering apparatus employing the filter of FIG. 1, and FIG. 5 schematically illustrates an embodiment of demultiplexing apparatus employing a filter of the type described with reference to FIG. 1, FIG. 6 schematically shows a modified version of the apparatus of FIG. 5, FIG. 7 schematically shows in end view another embodiment of demultiplexing apparatus using a filter of the type described with reference to FIG. 1.

FIG. 1 shows a holographic filter comprising a transparent substrate 1 carrying a coating film 2 (whose thickness is greatly exaggerated in the drawing for illustrative purposes). The coating 2 constitutes a hologram having refractive index variations through its thickness such that there are effectively planes or strata 3, each of uniform refractive index throughout the respective stratum or plane. The refractive index may in practice vary continuously, possibly in sinusoidal manner, through the coating thickness so as to provide, in effect, apparent layers of relatively high and low index. These apparent layers are generally parallel to the surface of the substrate 1 carrying the coating 2 but, in accordance with one aspect of the invention, are not exactly parallel to that surface and to each other but are slightly relatively inclined so that the spacing between the apparent layers continuously and progressively increases along the filter.

It will be understood by those skilled in the art that refractive index layers exactly parallel to each other and the substrate surface can provide a wavelength selective holographic reflector or mirror such that light of a particular wavelength incident at a specific angle is reflected while light of other wavelengths incident at that angle is transmitted. A wavelength selective reflection filter is thus provided, the spacing between the refractive index layers (which spacing is uniform between parallel layers) being related to the angle of incidence and the reflected wavelength, i.e. to the reflected wavelength for a given angle of incidence. It will therefore be seen that if, as proposed by an aspect of the present invention, the spacing between apparent refractive index layers varies along the filter, then for a given angle of incidence the reflected wavelength will vary along the filter. More particularly, with a continuous progressive increase along the length of the filter in the apparent refractive index layer spacing there is a corresponding continuous progressive increase along the length of the filter in the wavelength of reflected light (for a constant angle of incidence). The filter is therefore tunable in that the wavelength selectively reflected is dependent on the position along the filter.

Figure 2:
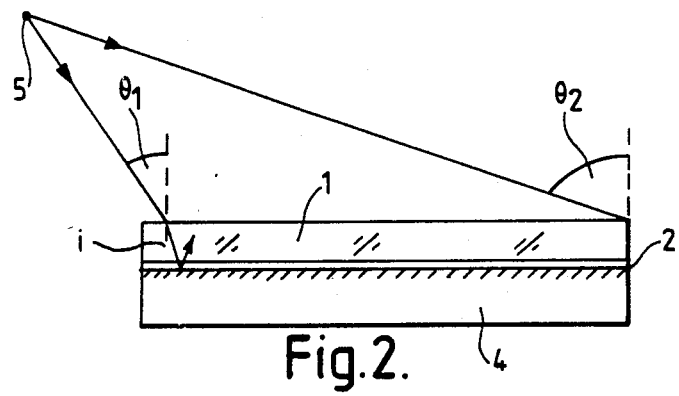

The hologram can be optically recorded in the coating 2 by a process schematically illustrated in FIG. 2. The coated substrate 1 is placed with the coating 2 backed by a front surface mirror 4.

A beam of light from a monochromatic source 5 incident on the substrate 1 is transmitted therethrough and through the coating 2 to the backing mirror 4 whose front surface is optically contacted to the coating. The beam incident on, and the beam reflected from, the backing mirror 4 interfere in the coating setting up an interference pattern having anti-nodes which form fringes running generally parallel to the substrate surface and corresponding to the eventual refractive index variations. With an angle of incidence (between the normal and the light ray) of 'i' in the coating, then the fringe spacing 'd' is, according to the Bragg condition, given by:

$$d = \frac{\lambda}{2 \cos i}$$

Where $\lambda$ is the wavelength of the recording illumination, i.e. of the source 5. With that wavelength constant, the fringe spacing can be varied by varying the angle of incidence. A continuous progressive variation along the length of the coating can be achieved by illumination with a divergent recording beam from the source 5, or by scanning a collimated recording beam about the source 5 position. In either case a range of incidence angles is produced, each angle corresponding to a particular position along the length of the hologram. The external angle of incidence thus increases continuously and progressively from '$\theta_1$', at the end of the substrate nearest the source position to '$\theta_2$' at the other end, and the fringe spacing increases correspondingly from a minimum value at one end to a maximum at the other, the fringes therefore being slightly relatively inclined.

It will be understood that after optical recording of the interference pattern of fringes in the coating 2, it is processed, if necessary, to enhance or permanently record the refractive index variations in the coating that thereby form the hologram. It may then be encapsulated by applying a transparent cover plate using optical cement to sandwich the hologram coating between the substrate and the cover plate. The initial coating 2 is, of course, photo-sensitive and is preferably dichromated gelatine. The substrate 1, and the cover plate is provided, are preferably of glass, and may have anti-reflection coatings on the faces which are not covered by the hologram coating.

It will further be understood that there may in practice be provided one or more optical elements, such as lenses, mirrors or prisms, in the light path from the actual source, which is preferably a laser, to the substrate 1. Such optical elements can be used to cause divergence of the light beam or to effect scanning of a collimated light beam about the source position, and it will be appreciated that the source position shown may in practice be an effective or virtual source position through intermediate optics.

The wavelength selectively reflected at a given position along the hologram for a given angle of incidence is related to the wavelength and the angle of incidence of the recording radiation. For example, at normal incidence the reflection is peaked at a wavelength equal to $\lambda/\cos i$ where '$\lambda$' is the recording wavelength and 'i' is the recording angle of incidence. Thus, the effective range of operation of the filter is dependent on the recording wavelength and the range of recording angles of incidence. With large recording angles of incidence correspondingly large fringe spacings can be achieved. In order to overcome limitations on the recording angle of incidence at the coating arising from refraction at the glass/air interface on the other side of the substrate, the hologram may be recorded through an index-matching medium lying against that other side during the recording so as to achieve the desired incidence angle 'i' in the coating. For example, the coated substrate may be immersed in an index matching liquid during recording, or an index matching solid could be optically contacted to the substrate.

Figure 3:
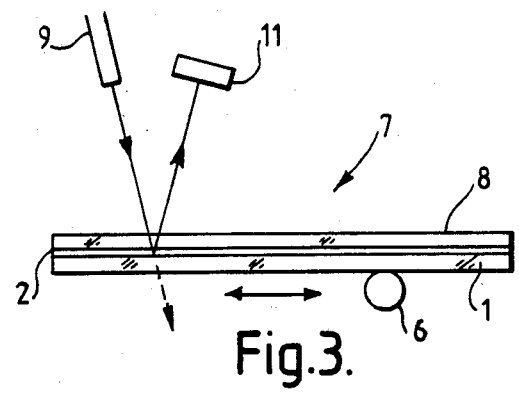

A tunable wavelength selective filter as described above can advantageously be used for selecting or separating out a desired wavelength channel from a plurality of such channels transmitted through a fibre optic cable. FIG. 3 schematically shows a simple optic terminal at which there is provided a holographic reflective filter 7 as described above comprising a laminate with the coating 2 sandwiched between the substrate 1 and an encapsulating or cover plate 8. Collimated light from a fibre optic cable 9 strikes the filter at a small angle to normal incidence. Light reflected by the hologram is received by a detector 11. The wavelength of light reflected back by the hologram is dependent on the position along the filter and can thus be changed by moving the filter (horizontally to the left or the right as viewed in FIG. 3) relatively to the cable 9 so as to change the position along the hologram where the light is incident. The terminal can therefore be tuned to a desired wavelength channel by appropriate positioning of the filter to reflect back light of that wavelength.

Although the light introduced by the fibre optic cable 9 is preferably collimated, it will be understood that this is not always absolutely essential. Thus, for example, if the end of the cable 9 and the detector 11 are located close to the filter 7 so that there is only a very small light path length between them, some divergence of the light beam issuing from the cable 9 may be tolerable since the short light path will be insufficient to permit substantial spread before reaching the detector 11 and the latter will adequately receive the reflected beam.

Figure 4:
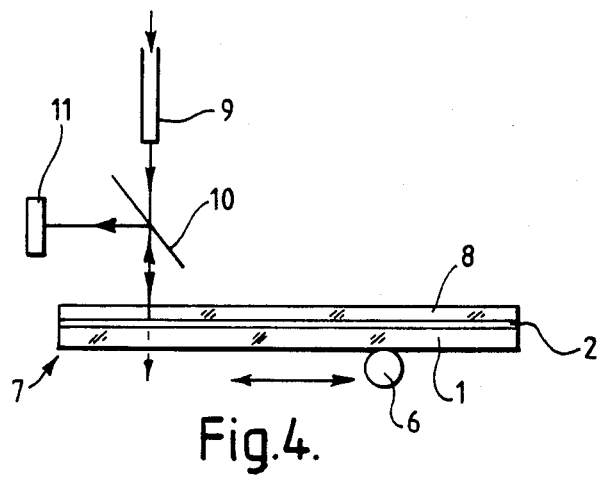

FIG. 4 schematically shows an arrangement basically similar to that of FIG. 3 but having a beam splitter 10 disposed between the input cable 9 and the filter 7. In this case collimated light from the cable 9 is transmitted through the beam splitter 10 to strike the filter 7 at normal incidence, and light reflected back by the hologram and reflected from the beam splitter 10 is received by the detector 11.

FIGS. 3 and 4 schematically indicate means 6 for moving the filter 7 horizontally past a stationary input cable 9 so as to change the position where the input light strikes the filter. It will be understood, of course, that the required relative movement could alternatively be achieved by keeping the filter stationary and moving the input cable, or possibly by moving both the filter and the input.

Figure 5:
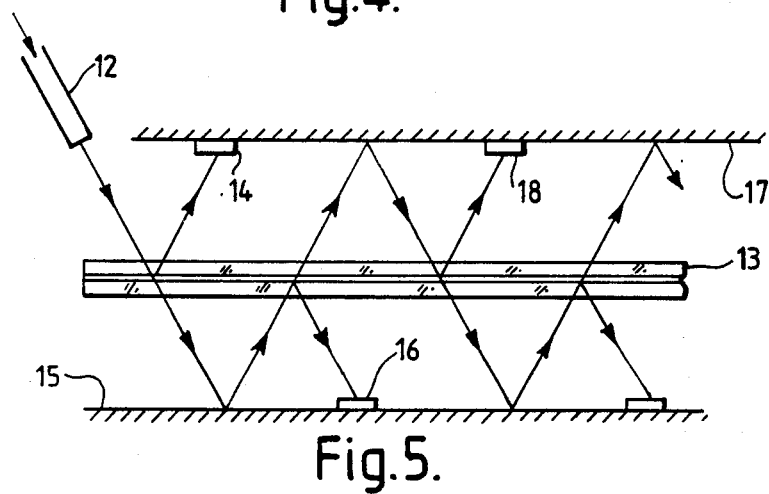

A filter as described above can also be used in a de-multiplexing system capable of separating and detecting a plurality of wavelength channels simultaneously. A simple arrangement is schematically shown in FIG. 5. Collimated light from a fibre optic cable 12 is incident at an angle on the filter 13 at a first position along the filter. Light of a wavelength reflected by the hologram at that position (and at that angle of incidence) travels to a first detector 14 while light of other wavelengths is transmitted through the hologram. This light is reflected from a mirror 15 and is incident again (at the same angle) on the filter from the other side at a second position along the filter. Light of a wavelength reflected by the hologram at that second position travels to a second detector 16 while remaining light of other wavelengths is transmitted through the hologram. Such light is reflected from a mirror 17 to be incident on the filter again at a third position where along and the light reflected by the hologram is received by a third detector 18 and the light transmitted through the hologram at the third position is reflected by the mirror 15 and so on. Thus, the light makes successive passes at the hologram and at each pass light of a wavelength reflected by the hologram at that position (and at the given angle of incidence which is the same at each pass) is filtered off to a respective detector. The various wavelength channels can thus be separated out and received by the respective detectors.

The angle of incidence shown in FIG. 5 is relatively large for ease of illustration and it may in practice be considerably smaller so that a greater number of pass positions occur along a given length of filter. A correspondingly greater number of wavelength channels can then be separated out. It will further be understood that the arrangement of detectors and mirrors could be different from that of FIG. 5 which shows the detectors 14, 16, 18 in front of respective strip mirrors 15 and 17 extending parallel to the filter 13. For example, there could be separate small mirrors interposed between the detectors. As a further possibility the strip mirrors could be slightly angled with respect to the plane of FIG. 5 and linear arrays of detectors provided alongside the mirrors.

Figure 6:
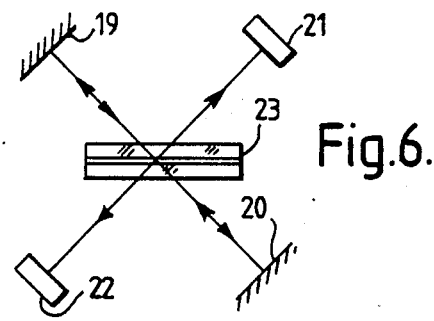

FIG. 6 is a schematic cross sectional view of a further arrangement having respective opposed strip mirrors 19 and 20 and respective opposed linear detector arrays 21 and 22 extending along the length of the filter 23 (i.e. orthogonally to the plane of FIG. 6) but angled with respect to the plane of the hologram. It will be understood that with this arrangement the input collimated light beam from the fibre optic cable (not shown in FIG. 6 but located adjacent an end of one of the strip mirrors) is angled both in the plane of FIG. 6 and in the plane orthogonal thereto (i.e. effectively the plane of FIG. 5) so that the light progresses along the length of the filter as it makes the successive passes at the hologram through reflection from the mirrors 19 and 20.

In the arrangements of FIGS. 5 and 6, the successive passes at the hologram are from opposite sides alternately. If desired the light can be directed so that all the passes at the hologram are from the same side of the filter. An example of such an arrangement is schematically shown in FIGS. 7 and 8.

Figure 7:
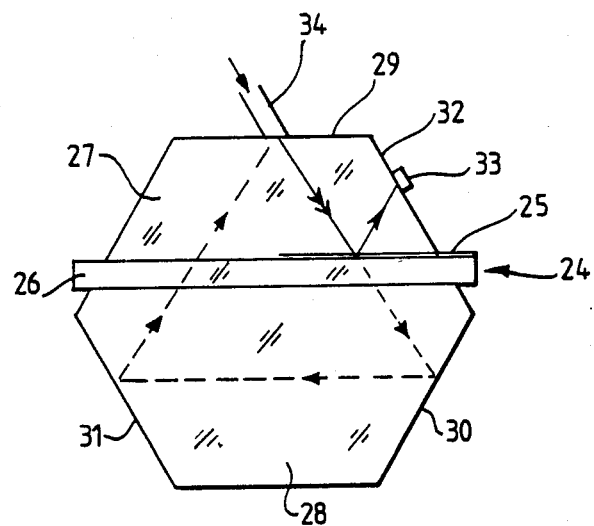

As can be seen from the end view of FIG. 7, the filter 24 has the hologram in a coating 25 along approximately one half only of the width of a major face of a transparent substrate 26. The length of the filter 24 runs orthogonally to the plane of FIG. 7 so the holographic coating 25 extends along the right hand half as viewed in FIG. 7 and selectively reflects light of a wavelength which continuously varies progressively along the filter as previously described, other wavelengths being transmitted through the filter. The left hand half of the substrate 26 can transmit all relevant wavelengths. Preferably the major faces of the substrate 26 not having the holographic coating 25 have an anti-reflection coating.

Figure 8:
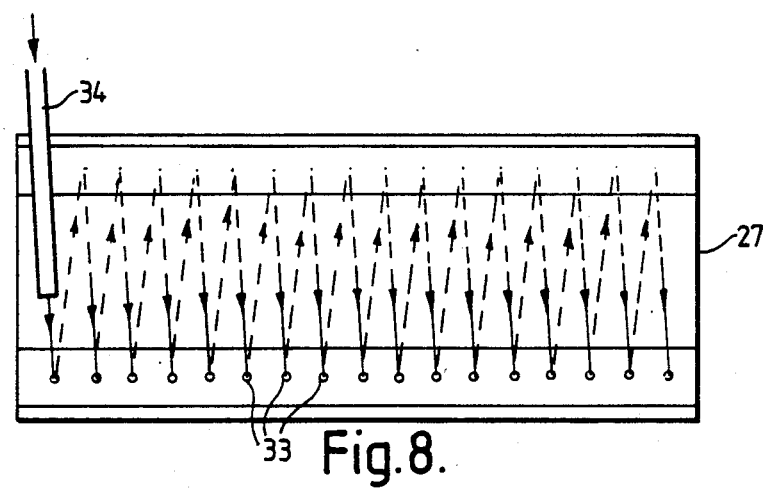
FIG. 8 is a schematic plan view of the apparatus of FIG. 7.

The filter 24 is effectively contained in a bar of transparent material and of regular hexagonal cross-section. In practice the bar is formed from two parts 27 and 28 cemented to opposite sides of the filter 24. Alternate longitudinal faces 29, 30 and 31 of the bar are suitably coated so that they reflect internally and thus provide three strip mirrors arranged round and extending along the filter. The other longitudinal faces, and the end faces, of the bar are preferably treated, e.g. ground and blackened or coated, to prevent unwanted light transmission or reflection at these faces. One of these faces, 32, however, carries a linear array of detectors 33 and is arranged to permit passage of light through the face to the detectors. Also, the mirrored face 29 is arranged adjacent one end to permit input of a collimated light beam from a fibre optic cable 34. This light beam strikes the hologram 25 and light of the wavelength reflected by the hologram at that position is received by the first detector 33. Light of other wavelengths transmitted through the hologram is reflected firstly from the face 30 and then the face 31, is transmitted through the left hand half of the filter substrate 26, and is then reflected from the face 29. It then strikes the hologram 25 again (at the same angle of incidence) at a position further along, the input cable 34 being angled in the plane of FIG. 8 as well as the plane of FIG. 7 to cause progression of the light along the bar and filter. Light of the wavelength reflected by the hologram at that further position is received by the second detector 33 while remaining light of other wavelengths is transmitted through the hologram for onward progression along and further passes (at the same angle of incidence) at the hologram in similar fashion, the passes all being from the same side of the hologram through the action of the light directing mirrors 30, 31 and 29. The successive detectors 33 thus receive light of different respective wavelengths and miltiplexed wavelength channels transmitted through the fibre optic cable 34 are demultiplexed and detected separately but simultaneously.

it will be understood that the hexagonal bar arrangement of FIGS. 7 and 8 is a convenient arrangement given by way of illustration and example, and that other arrangements operating on the same principle could be devised. For example, more than three mirrors could be provided to direct the light round between passes at the hologram. Light reflected by the hologram could, instead of passing directly to the respective detector, be directed thereto by an optical element, and in particular by an optical fibre. Thus, in all the embodiments of FIGS. 3 to 8 the detectors could in practice be located away from the positions shown and the light could be received by optical fibres terminating at those positions and which conduct the light to the detectors. The input light from the optical fibre cables can conveniently be collimated by an appropriately shaped end to the fibre optic, although other means of collimation, e.g. a separate lens, could be employed if desired. It will be appreciated that collimation is not necessarily essential in all circumstances and, even where it is desired, some departure from precise collimation of the input light may be tolerable, particularly where small distances of light travel are involved. The term 'substantially collimated' is intended to include such tolerable departures.

It will be understood that the working range of a particular filter can be arranged to meet requirements by appropriate choice of the hologram recording beam wavelength and the range of angles of incidence as previously discussed. It will further be understood that the wavelengths involved may, but need not necessarily be in the visible part of the electromagnetic spectrum, and the terms 'light', 'optical' and the such when used herein are to be construed accordingly. Thus, the wavelengths involved could, for example, be in the ultraviolet or the infra red, and, as a specific illustrative example, the working range could be about 1.2 to 1.6 microns wavelength reflected at normal incidence with the hologram constructed using a recording wavelength of 514.5 nanometers. It will also be appreciated that references herein to a wavelength, and in particular to a wavelength selectively reflected by the hologram, should be construed as generally meaning in practice a narrow waveband rather than an exact unique individual wavelength value.

Yet further it will be appreciated that the precise form of filter shown and described is a preferred form given by way of illustration and example and other suitable forms may be apparent to those skilled in the art. Notably, the coated substrate surface to which the hologram refractive index strata or apparent layers lie generally parallel may conveniently be, and is shown as, planar but it need not necessarily be so; it could be curved or bent. Likewise the substrate itself, and any cover plate, it conveniently, but need not necessarily be, of basically planar or platelike form; the holographic coating could, for example, be formed on a face of an optical element such as a prism or a lens. Also, references herein to the 'length' of or 'along' the filter or hologram are not to be construed in limited fashion as necessarily meaning the major dimension, although that would usually be the case; thus, the continuous progressive variation 'along the length' of the filter or hologram could in fact be considered as across the width in some circumstances. Further, while glass is the preferred material for the substrate, and cover plate if any, and also for the hexagonal bar parts in the FIGS. 7 and 8 embodiment, other optically transparent (to the relevant wavelengths) material might be employed. Dichromated gelatine is likewise the preferred substance for the hologram recording medium of the coating but other substances might be used.

It will further be appreciated that the embodiments of FIGS. 3 and 4, although preferably employing a holographic reflection filter which can continuously and progressively vary the reflected wavelength as the incident light progresses along the hologram, as specifically described above, could alternatively employ other forms of holographic reflection filter which, with a given angle of incidence, reflect different wavelengths at different positions along the filter. In particular, a 'stepped' holographic reflection filter formed from a series of strips of hologram, each strip tuned to one wavelength for that position of incidence, could be used. Similarly, although the embodiments of FIGS. 5 to 8 preferably use a holographic reflection filter with continuous progressive variation of reflected wavelength along the hologram as specifically described, other forms of holographic reflection filter capable of reflecting different wavelengths could be employed. Again, as a further example, the holographic reflection filter could be of 'stepped' form having a plurality of holographic strips each of which reflects a different respective wavelength (at a given angle of incidence), and the apparatus could be arranged so that the successive passes at the filter occur at respective successive hologram strips. Such 'stepped' form of filter might perhaps be desirable in certain circumstances for ease of manufacture or specific device requirements.

It will also be appreciated that tuning of the reflected wavelength can be effected by change of angle of incidence, and this facility may be used, for example, to achieve further tuning of the filter by providing for angular adjustment. The facility for wavelength tuning by change of angle of incidence also means that the different wavelengths could be reflected from a uniform hologram by introducing the light to the hologram at respective different angles of incidence, i.e. by causing the light to travel relatively to the filter in a manner which progresses the angle at which the light is incident on the filter so that the filter reflects different wavelengths at the respective different angles of incidence. This provides a possible alternative to having a filter with a varying hologram as in the described embodiments of FIGS. 3 to 8 and causing the light to travel relatively to the filter in a manner which progresses the position at which the light is incident on the filter so that the filter reflects different wavelengths at the respective different positions. In the embodiments of FIGS. 3 and 4 this is done by effecting relative movement between the filter 8 and the light input cable 9, while in the embodiments of FIGS. 5 to 8 it is done by the mirrors which direct the light to make a plurality of successive passes at the filter at respective different positions therealong. Embodiments may of course be devised in which the light is caused to travel relatively to a filter with a suitable hologram in a manner which progresses both the position and the angle at which the light is incident on the filter so that the filter reflects different wavelengths at the respective different positions and angles of incidence.

The filter is described above in the embodiments of FIGS. 3 to 8 as operating in a demultiplexing mode to separate out multiplexed wavelength channels. It could, of course, be used in reverse mode to multiplex respective wavelength inputs. Thus, for example, multiplexing apparatus could be basically similar to the demultiplexing apparatus described with reference to FIGS. 5, or 6, or 7 and 8, but with the detectors replaced by respective collimated light inputs of different wavelengths which are combined by means of the holographic filter in reverse fashion to the described separation.

In this mode light introduced at each position along the filter is of a wavelength reflected by the hologram at that position, and after reflection at that position that light is transmitted through the hologram at each subsequent pass position. Light of other respective wavelengths introduced and reflected by the hologram at the subsequent pass positions thus becomes combined therewith so that all the introduced wavelengths successively combine along the filter. The eventual combined beam is received by a fibre optic output cable for onward transmission from the multiplexer.

We claim:

1. Apparatus comprising a wavelength selective holographic reflection filter having a hologram with refractive index variations through its thickness such that is capable of reflecting different wavelengths, light input means for introducing light to the filter, means for causing the light to travel relatively to the filter in a manner which progresses the position and/or angle at which light not already reflected from the filter is incident on the filter so that different wavelengths are reflected from the filter at the respective different positions and/or angles of incidence, and light receiving means for receiving light from the filter.

2. Apparatus according to claim 1 in which the light input means introduces substantially collimated light.

3. Apparatus according to claim 1 comprising means for effecting relative movement between the filter and the light input means so as to change the position of incidence of light on the filter.

4. Apparatus according to claim 1 in which the means for causing the light to travel relatively to the filter in the said manner comprises light directing means for directing the light to make a plurality of successive passes at the filter.

5. Apparatus according to claim 4 in which the light directing means are arranged so that the successive passes at the filter are from alternately opposite sides.

6. Apparatus according to claim 5 in which the light directing means comprise opposed mirrors located respectively on said opposite sides of the filter.

7. Apparatus according to claim 4 in which the light directing means are arranged so that the successive passes at the filter are all from the same side thereof.

8. Apparatus according to claim 7 in which the light directing means comprises a plurality of mirrors.

9. Apparatus according to claim 8 in which said mirrors are provided on faces of a bar of transparent material.

10. Apparatus according to claim 1 in which the wavelength selective holographic reflection filter comprises a substrate having a hologram coating with refractive index variations through its thickness corresponding to interference fringes running generally parallel to the surface of the substrate carrying the coating but slightly relatively inclined so that the fringe spacing continuously and progressively increases along the filter.

11. Apparatus according to claim 10 in which the filter comprises a laminate in which the coating containing the hologram is sandwiched between a transparent substrate and a transparent cover.

12. Apparatus comprising a holographic reflection filter capable of reflecting different wavelengths, light input means for introducing substantially collimated light to the filter, light directing means for directing the light to make a plurality of successive passes at the filter in a manner such that a different wavelength is reflected from the filter at each pass, and light receiving means for receiving light from the filter.

13. Demultiplexing or multiplexing apparatus comprising a wavelength selective holographic reflection filter from which, with a given angle of incidence, different wavelengths are reflected at different positions along the filter, light input means for introducing substantially collimated light to the filter, light directing mans for directing the light so as to make a plurality of successive passes at the filter at respective different positions therealong, and light receiving means for receiving light from the filter.

* * * * *